Sept. 19, 1967  D. C. MEYERS  3,342,071
SELF-POWERED METER RATE COMPENSATOR
Filed June 7, 1965  2 Sheets-Sheet 1

INVENTOR
DOUGLAS C. MEYERS
BY
Cameron, Kerkam & Sutton
ATTORNEYS

Sept. 19, 1967    D. C. MEYERS    3,342,071
SELF-POWERED METER RATE COMPENSATOR
Filed June 7, 1965    2 Sheets-Sheet 2

INVENTOR
DOUGLAS C. MEYERS
BY
Cameron, Kerkam & Sutton
ATTORNEYS

United States Patent Office 3,342,071
Patented Sept. 19, 1967

3,342,071
SELF-POWERED METER RATE COMPENSATOR
Douglas C. Meyers, Connersville, Ind., assignor to Dresser Industries, Inc., Dallas, Tex., a corporation of Delaware
Filed June 7, 1965, Ser. No. 461,773
12 Claims. (Cl. 73—261)

The present invention relates generally to fluid metering devices, and more particularly to an arrangement for increasing the proof or accuracy of a fluid meter of the rotary positive displacement type without requiring the use of an external power source other than the metered fluid itself.

It is well recognized that any rotating mechanism develops a certain amount of friction, that the magnitude of this friction is a function of the speed of rotation, and that the speed of rotation derivable from a given amount of energy is inversely proportional to the amount of friction. It is also recognized that the total friction of a rotating element is composed of a dynamic component which is a function of speed and a semi-constant component which is a function of static friction, the latter component being always less than the static friction and being semi-constant regardless of speed.

In a fluid meter of the rotary positive displacement type embodying multi-lobe impellers which are rotatably mounted within a casing and geared together so as to rotate in opposite directions in timed relation, the flow of fluid through the casing causes the impellers to rotate and thus meter the fluid by means of a counting mechanism which is calibrated to indicate the volumetric flow through the meter as a function of the number of revolutions of the impellers. In the conventional meter of this type, the energy which causes the impellers to rotate is supplied by the fluid being metered in the form of a differential pressure across the meter, the energy produced by the differential pressure balancing the total retarding force or friction for any speed of rotation or displacement rate. Thus, for practical purposes, the differential pressure is a function of the speed of rotation of the impellers and the resulting frictional resistance to rotation.

In meters of this type, even though the impeller clearances are maintained very closely, there is a certain amount of leakage past the impellers due to the differential pressure which affects the accuracy of the meter, the amount of leakage being a function of the differential pressure. Since the differential pressure is a function of friction, leakage is also a function of friction. Although the differential pressure, leakage and dynamic friction are more or less proportional to meter speed, since there is a semi-constant friction component which is a function of static friction, there are also constant components of differential pressure and leakage which are not proportional to speed.

It has been found by tests that the accuracy of a rotary positive displacement fluid meter may be made practically 100% over the entire range of meter operating speeds or capacity if the constant component of friction or drag is eliminated by adding rotational energy equal to this component. By eliminating this constant friction component, i.e., the friction which exists at almost zero speed, but not the higher static friction which occurs at zero speed, the constant leakage and constant differential pressure factors may also be eliminated, with the result that the dynamic differential pressure, leakage and friction components will be proportional to the speed of rotation or the displacement rate, and the accuracy of the meter will not be affected by the latter.

Various attempts have been made heretofore to increase the accuracy of meters of the type described by positively driving the impellers by devices which are responsive to variations in differential pressure. However, such attempted solutions of the problem either are inadequate because they involve the by-passing around the meter of a portion of the fluid which would otherwise flow therethrough and be measured, or are objectionable because they require a source of external power.

It is therefore a primary object of the present invention to overcome the disadvantages of prior art devices for increasing the accuracy of a fluid meter of the rotary positive displacement type by compensating for the constant component of friction or drag of the meter without the use of an external source of energy other than the metered fluid itself.

Another object is to provide a novel self-powered fluid meter rate compensating mechanism which removes and stores energy from the metered fluid at times when the flow rate is such that the removal of energy has only a slight effect on metering accuracy, i.e., at rates above 50% of the meter capacity, and which then utilizes that energy at low flow rates to overcome the adverse effect of a relatively high friction-to-available energy ratio and thus extend the accuracy curve to much lower limits.

To this end, there is provided a completely self-contained meter rate compensator comprising a small D.C. motor-generator which is arranged to drive the meter under substantially no-flow conditions to compensate for the frictional resistances of the meter at this speed. Thus, the constant leakage factor in the meter is eliminated by the addition of rotational energy sufficient to overcome the constant friction components which are independent of speed and which have the greatest effect on accuracy of the meter. The motor-generator operates as a motor at low meter speeds adding rotational energy until the meter reaches approximately 50% of its rated capacity, after which it operates as a generator and extracts energy from the meter. This extracted energy is then stored by charging the battery from which the motor-generator is energized. A flow-sensitive switch is also provided for breaking the motor-battery circuit to prevent draining of the battery under no-flow conditions.

These and other features of the invention will appear more fully from the following detailed description of the mechanical structure and mode of operation of one form of mechanism embodying the inventive concept. While the specification concludes with the claims particularly pointing out and distinctly claiming the subject matter of the present invention, it will now be described with reference to the accompanying drawings which, however, are for the purpose of illustration only, and are not intended to represent the full scope of the invention defined by the appended claims.

In the drawings, wherein like reference characters indicate like parts throughout the several views.

Figure 1:
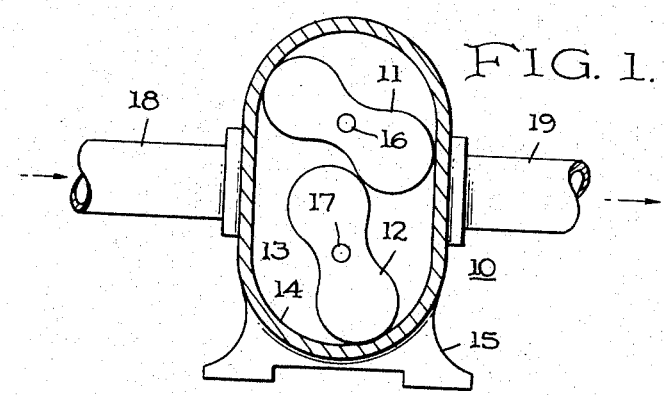
FIG. 1 is an end elevational view, partly in cross-section, of a fluid meter of the rotary positive displacement type with which the compensator of the present invention is adapted to be used.

Referring now to drawings, there is shown in FIG. 1 a typical rotary positive displacement fluid meter 10 which comprises two multi-lobe rotors or impellers 11 and 12 supported for rotation within a chamber 13 formed by the inner walls of the surrounding casing 14 and provided with a suitable supporting base 15. The rotors 11 and 12 are mounted on parallel shafts 16 and 17, respectively, which are geared together in a manner well known in the art so that the rotors rotate in opposite directions in timed relation.

The contour and finish of the rotors and the accuracy of cut of the gears is such that a small operating clearance of a few thousandths of an inch is maintained between the rotors as they rotate. The surrounding walls of casing 14 conform to the path described by the ends of the rotor lobes, and are otherwise so shaped that a small operating clearance of a few thousandths of an inch or less is also provided between the casing walls and the rotors.

Flow of gas to be measured is in the direction of the arrows, or from left to right as shown in FIG. 1, and is effected by supplying gas under pressure to the gas inlet line 18 which is connected to the inlet side of the meter 10. A gas outlet line 19 is provided from the outlet side of the meter for supplying the metered gas to a burner or other gas using device. A read-out or counting mechanism (not shown) is suitably connected to one of the shafts 16 and 17 to count the number of revolutions of the rotors which are then calibrated to volume flow through the meter. Since various types of counting mechanisms well known in the art may be utilized, this portion of the meter is not described in detail herein.

Thus far, there has been described a conventional rotary positive displacement gas meter wherein the energy necessary to overcome the resistance to running of the meter, such as bearing friction, gearing friction and the friction of the counting mechanism, is supplied directly to the rotors by the gas being measured. The actual speed of rotation therefore varies from the theoretical frictionless speed of rotation at all speeds of the meter, but is proportionally lower at low flow rates through the meter. The variation is particularly significant in gas meter installations, since the flow energy of the gas necessary to overcome the resistance to running is large in proportion to the total amount of energy available from the gas flow, particularly at low flow rates.

Figure 2:
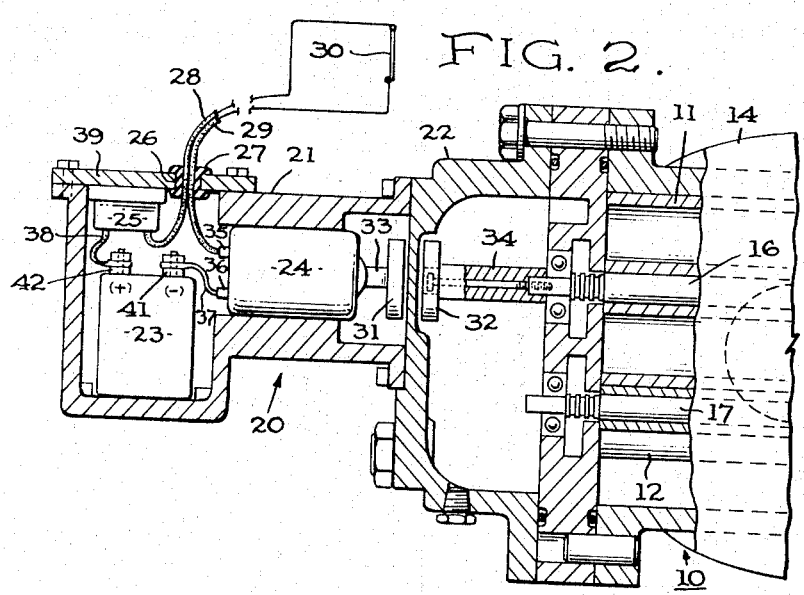
FIG. 2 is a side elevational view, partly in cross-section, of one end of the meter of FIG. 1 showing one form of meter rate compensator embodying the invention.

Referring now to FIG. 2, there is shown therein one embodiment of the present invention wherein a rotary positive displacement meter 10, similar to the meter of FIG. 1, is provided with a self-contained battery operated meter rate compensator 20 arranged to drive shaft 16 of the meter 10 so as to compensate for losses due to friction. Compensator 20 is contained within a casing or housing 21 which is secured to the meter end cover 22, and which suitably supports therein a rechargeable battery 23, a D.C. motor-generator 24 and a voltage controller 25. Housing 21 is provided with a removable cover plate 39 having an opening 26 therein in which is supported an insulating grommet 27 through which electrical leads 28 and 29 extend from the voltage controller 25 and motor-generator 24 to an externally positioned flow-sensitive switch 30 adapted to open the circuit to the motor-generator when there is no flow through the meter 10.

D.C. motor-generator 24 serves to add rotational energy to the meter 10 exactly equal to the constant drag or constant component of friction of the meter, and is coupled to rotor shaft 16 of the meter by a magnetic coupling comprising a pair of four-pole disc magnets 31 and 32 supported in axial alignment on opposite sides of the vertical wall of end cover 22. Disc magnet 31 is fixed to shaft 33 of the motor-generator, while disc magnet 32 is fixed to an extension 34 of rotor shaft 16. Meter end cover 22 is preferably made of aluminum to prevent interaction with the magnetic field set up by the disc magnets of the magnetic coupling.

Internal power connections to the windings of the motor-generator 24 are made through a pair of terminals 35 and 36 which extend through the motor-generator casing and are insulated therefrom. Power is supplied to to motor-generator from the storage battery 23, which is preferably of the nickel-cadmium type, through a lead 37 which connects the negative terminal 41 of the battery to the motor-generator terminal 36, the circuit being completed from the positive terminal 42 of the battery through a lead 38, the voltage controller 25, lead 28, switch 30 and lead 29 which is connected to terminal 35 of the motor-generator.

Figure 3:
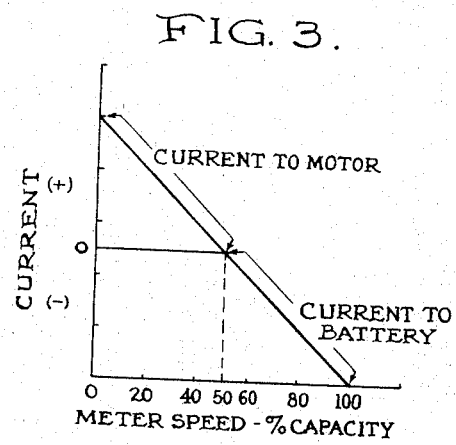
FIG. 3 is a graphical illustration of the current-torque characteristics of the motor-generator shown in FIG. 2 in relation to meter speed.

For a meter of any particular capacity, a motor-generator is selected which has a speed-torque characteristic such as to apply just sufficient torque to meter shaft 16 to overcome the frictional drag at almost zero flow rate through the meter, and to apply zero torque at 50% of meter capacity. Referring to FIG. 3, there is graphically illustrated a current-torque curve for the motor-generator of the meter rate compensator of the present invention plotted against meter speed, with the motor-generator connected to a battery of fixed voltage.

As can be seen from FIG. 3, current drain on the battery is a maximum as zero speed is approached, resulting in maximum torque input to the meter. At 50% of meter capacity or speed, the no-load point is reached at which torque and current are zero. Above 50% of meter capacity, the current flow is reversed so as to recharge the battery, maximum torque output from the meter and maximum current to the battery being reached at 100% of meter capacity. The switch-over point from motor to generator operation may be varied by the voltage controller 25 so as to establish a particular meter operating condition for different battery voltages and for motors having different speed-torque characteristics. To this end, voltage controller 25 may be a variable impedance element such as, for example, a variable resistance. The setting of the voltage controller is dependent on the particular battery and motor-generator combination and the desired input torque at almost no-flow conditions.

To eliminate a continuous drain of energy from the storage battery 23 under no-flow conditions, flow-sensitive switch 30 is connected in series with the battery and the motor generator 24 so that the latter is energized only when a flow through the meter 10 is established. Switch 30 may be of any suitable construction capable of responding to the flow of fluid through the meter; for example, the switch assembly may comprise a flapper mounted in the gas inlet line 18 adjacent the meter so as to act in a manner similar to a swing check valve, hanging freely in a vertical position under no-flow conditions, and a suitable tilt-responsive electrical switch element, such as a mercury switch, which is so connected to the flapper that its contacts are open when the flapper hangs vertically, but are closed when a flow of fluid through the meter causes the flapper to swing in the direction of the flow.

In operation, with the meter rotors just barely rotating and the battery 23 connected to the motor-generator 24 by closure of switch 30, the voltage is so adjusted by means of the voltage controller 25 that the differential pressure across the meter 10 is zero, indicating that the torque input of the motor is supplying the exact amount of energy necessary to compensate for the constant friction components in the meter. The current flow from the battery to the motor, which may be measured by a milliammeter, is then a maximum. As the meter is speeded up by increasing the fluid flow, the build-up of back EMF causes the motor torque and current to decrease until the meter speed approximates 50% of the rated capacity, at which time the motor torque and current should have dropped to zero. As the meter is driven at speeds above 50% of capacity, the torque and current should increase, but in the reverse direction, and the motor-generator functions as a generator to charge the battery.

Figure 4:
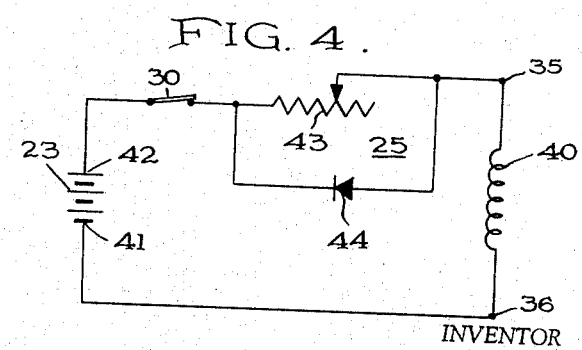
FIG. 4 is a schematic diagram of the electrical circuit of the motor-generator.

Referring now to FIG. 4, the electrical circuit of the meter rate compensator of the present invention comprises the motor-generator winding 40 which is connected across the terminals 41 and 42 of battery 23 in series with flow-responsive switch 30 and the variable resistor 43 of voltage controller 25. The resistor 43 is used to set the voltage input to the motor-generator for the particular battery-motor combination used, and is not necessary when correct battery voltage and motor characteristics give the desired torque. Since the external resistance of resistor 43 acts as an additional load above no-load speed and reduces the energy deliverable to the battery for recharging, a diode 44 is connected across the resistor so that the latter is shorted out of the circuit at meter speeds above the no-load speed point of the motor-generator. In this manner, the total generated energy above no-load speed is usable for charging the battery.

If desired, other arrangements may be utilized for providing the desired torque-no load characteristics. For example, motor-generator 24 may be provided with a geared speed change mechanism instead of using an external resistance in the battery-motor circuit.

Figure 5:
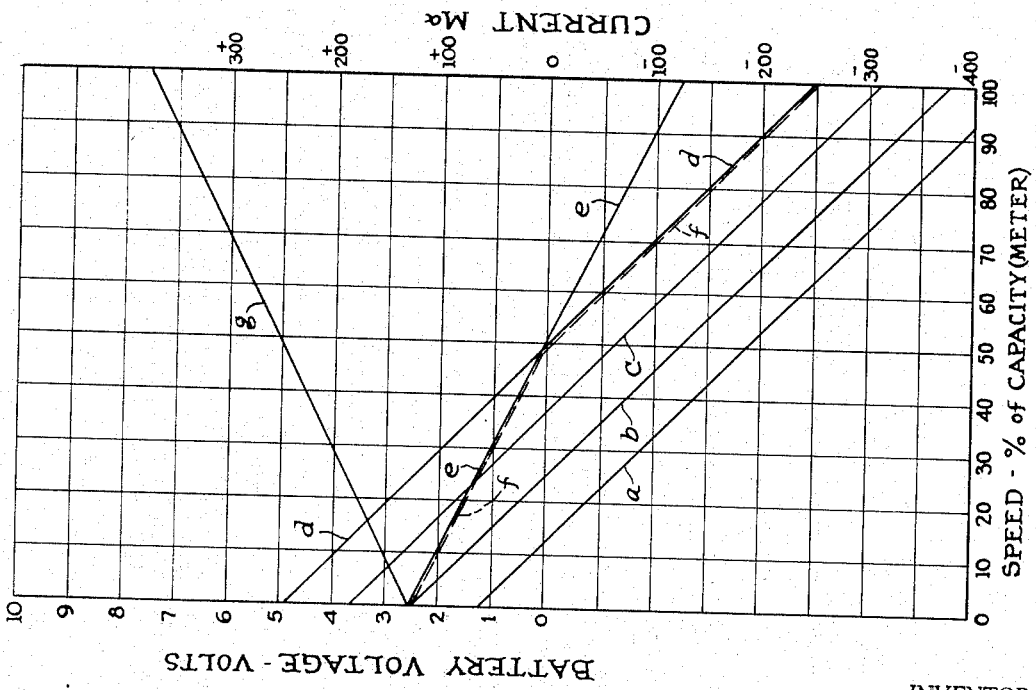
FIG. 5 is a graphical illustration of the effect of varying the voltage input to the motor-generator and of using an external resistance in the motor-battery circuit.

In order to illustrate the effect of varying the input voltage of the motor-generator and of using an external resistance, FIG. 5 shows the current vs. speed curves for a particular motor-generator using various battery voltages, an external resistance in series with the battery, and an external resistance and diode combination in series with the battery. Curves $a$, $b$, $c$ and $d$ show the current-speed characteristics utilizing nickel-cadmium batteries of 1¼, 2½, 3¾ and 5 volts, respectively, without any external resistance, and illustrate how variation of tht voltage shifts the changeover or no-load point of the motor-generator in relation to meter speed. Curve $e$ shows the effect of using a 5 volt battery and an external resistance set to reduce the voltage input to the motor-generator to 2.5 volts in order to obtain a desired starting current of 125 milliamperes and current reversal above 50% of rated meter speed, while curve $f$, displaced slightly from curve $e$ and represented by a dashed line for clarity, shows the current-speed characteristics curve when utilizing a 5 volt battery and an external resistance with a diode in parallel with the resistance to short out the resistance during current reversal above no-load speed. Curve $g$ shows the voltage applied to the motor terminals using a 5 volt battery and an external resistance to give the desired starting current of 125 milliamperes and current reversal above 50% meter speed.

By use of the present invention, the accuracy of a rotary positive displacement meter is made practically 100% from zero to 100% of the meter capacity by eliminating the constant drag or constant component of friction through the addition of rotational energy exactly equal to this component. By eliminating the constant friction component, the constant leakage and constant differential pressure factors are also eliminated. Thus, dynamic differential pressure, leakage and friction would be proportional to the speed or rate of the meter, and accuracy would not be affected by speed or metering rate.

Figure 6:
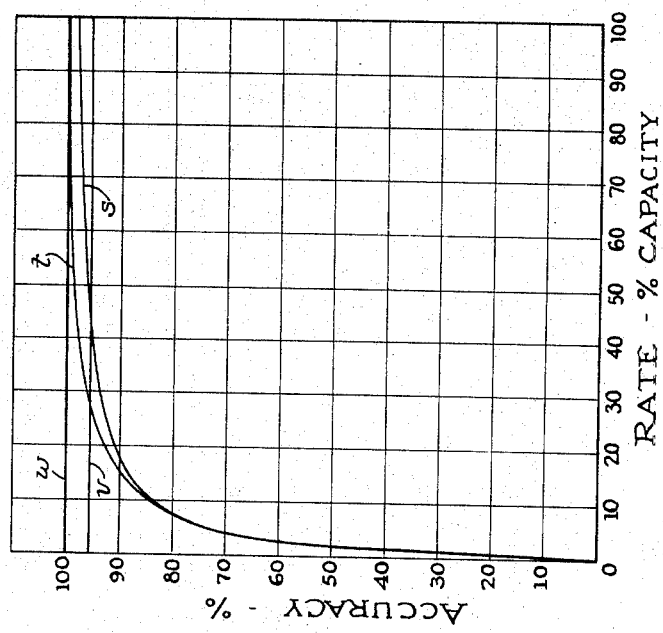
FIG. 6 is a graphical comparison of the proof curve of a meter embodying the rate compensator of the present invention with that of the same meter without the compensator.

Assuming that the meter operates over a range of from zero to 100% of capacity with the time metered being spread evenly over the entire range, FIG. 6 graphically compares the accuracy of a rotary positive displacement fluid meter with and without the meter rate compensator of the present invention.

Curve $s$ of FIG. 6 shows an example of the type of accuracy curve which may be expected from a rotary positive displacement fluid meter without meter rate compensation and with a 1:1 factor of indicated (counter reading) vs. actual (measured) rate. Curve $t$ of FIG. 6 shows an example of the accuracy curve for the same condition as curve $s$, but with the counter speeded up so that at rated capacity (100%) the accuracy curve indicates 100%. In this case, the ratio of the counter was 1.02:1. This speeding up of the counter corrects the error at rated 100% capacity, but does not improve the accuracy appreciably at the lower end of the rate range.

Curves $v$ and $w$ of FIG. 6 illustrate the results obtained by incorporating a meter rate compensator in accordance with the present invention. Curve $v$ illustrates the proof obtained with a 1:1 counter ratio, while curve $w$ shows the proof obtained with a 4% speed up on the counter, i.e., a 1.04:1 ratio which provides 100% accuracy over the entire range of the meter without the necessity of providing an external source of energy, other than the metered fluid. As can be seen in FIG. 6, while the constant friction factor is eliminated at the low end of the meter rate curve by use of the compensator, an additional load, equivalent to 2% slippage, has been added at the upper end. Thus, although the accuracy curve has been flattened out, it is 4% low over the entire range. However, a 4% speed up of the counter is sufficient to raise the accuracy curve to 100% over the entire range.

By comparing the accuracy curves of FIG. 6, the advantages of the present invention can be readily appreciated. Curves $s$ and $t$ show that, without meter rate compensation, the percent of accuracy decreases gradually below about 60% of meter capacity and drops sharply at flow rates below 20% capacity, whereas, with meter rate compensation, the accuracy curve is flattened out and can be raised to 100% over the entire range of the meter.

There is thus provided by the present invention a simple yet effective means for adding rotational energy to a rotary positive displacement meter, and for removing energy from the metered fluid and storing this energy for use when needed. Although only one specific embodiment of the invention has been described and illustrated, it will be obvious to those skilled in the art that various modifications may be made therein. It is therefore intended by the appended claims to cover all such modifications which fall within the true scope of the invention.

What is claimed is:

1. A self-powered meter rate compensator comprising in combination with a rotary positive displacement meter, motive means so coupled to a rotatable element of said meter as to be capable of either driving or being driven by said element, and a rechargeable source of energy so connected to said motive means as to be capable of either delivering energy thereto or receiving energy therefrom, said motive means and said source of energy having characteristics such that, when said meter is operating at speeds less than approximately 50% of capacity, said motive means supplies rotational energy to said rotatable element, and, when said meter is operating at speeds greater than approximately 50% of capacity, said motive means is driven by said rotatable element and supplies energy to said source.

2. A self-powered meter rate compensator comprising in combination with a rotary positive displacement meter, a motor-generator so coupled to a rotatable element of said meter as to be capable of either driving or being driven by said element, a rechargeable storage battery, and means forming an electrical circuit between said motor-generator and said battery wherein current may flow in one direction to energize said motor-generator and in the opposite direction to charge said battery, said motor-generator having speed-torque characteristics such that, when said meter is operating at speeds less than approximately 50% of capacity, said motor-generator supplies rotational energy to said rotatable element, and, when said meter is operating at speeds greater than approximately 50% of capacity, said motor-generator is driven by said rotatable element and supplies charging current to said battery.

3. A self-powered meter rate compensator comprising in combination with a rotary positive displacement meter having a rotatable element, a motor-generator having a shaft, means for so coupling said motor-generator shaft to said rotatable element of said meter that said motor-generator is capable of either driving or being driven by said rotatable element, a rechargeable storage battery, and means forming an electrical circuit between said motor-generator and said storage battery, the voltage of said battery and the characteristics of said motor-generator being so selected that said motor-generator is operable as a motor to supply rotational energy to said rotatable element when said meter is operating at speeds less than approximately 50% of capacity, and as a generator for supplying electrical energy to recharge said battery when said meter is operating at speeds greater than approximately 50% of capacity.

4. A self-powered meter rate compensator as set forth in claim 3 wherein said electrical circuit forming means includes a switch responsive to the flow of fluid through said meter, said switch being open under no-flow conditions and being closed when fluid is flowing through said meter.

5. A self-powered meter rate compensator as set forth in claim 3 wherein said electrical circuit forming means includes means for varying the voltage applied by said battery to said motor-generator.

6. A self-powered meter rate compensator as set forth in claim 5 wherein said electrical circuit forming means also includes a diode electrically connected in parallel with said voltage varying means for shorting out said last-named means when said motor-generator is acting as a generator and supplying electrical energy to charge said battery.

7. A self-powered meter rate compensator comprising in combination with a rotary positive displacement meter having a casing including an inlet and an outlet and a pair of multi-lobe rotors rotatably mounted in said casing and adapted to permit the flow of fluid therethrough from said inlet to said outlet, a housing supported at one end of said casing having mounted therein a motor-generator and a rechargeable battery, means coupling said motor-generator to one of said rotors for effecting energy transfer therebetween, and means electrically connecting said battery to said motor-generator, said motor-generator having a speed-torque characteristic such that said motor-generator is operable as a motor at meter flow rates less than approximately 50% of capacity to supply rotational energy to said meter rotor, and as a generator at flow rates greater than approximately 50% of capacity to extract rotational energy from said meter for recharging said battery.

8. A meter rate compensator for improving the accuracy of a meter comprising in combination with a rotary positive displacement meter having a casing including an inlet and an outlet and a pair of multi-lobe rotors rotatably mounted in said casing and adapted to permit the flow of fluid therethrough from said inlet to said outlet, a housing supported at one end of said casing, a rechargeable battery and a motor-generator mounted in said casing, means coupling said motor-generator to one of said rotors for transferring energy therebetween, said motor-generator being operable in dependence upon the speed of rotation of said motor to either supply mechanical energy to or extract mechanical energy from said meter, means forming an electrical circuit between said battery and said motor-generator, and a normally open switch in said circuit adapted to be closed upon the flow of fluid through said meter from said inlet to said outlet.

9. A meter rate compensator as set forth in claim 8 wherein said electrical circuit forming means includes a voltage controller connected in series with said switch for varying the voltage supplied by said battery to said motor-generator.

10. A meter rate compensator as set forth in claim 9 wherein said voltage controller comprises a variable impedance element, and means for electrically shorting said element when said motor-generator is extracting energy from said meter.

11. A meter rate compensator as set forth in claim 10 wherein said shorting means is a diode having its anode connected to one terminal of said motor-generator and its cathode connected to the positive terminal of said battery through said switch, whereby said voltage controller is effective to control the voltage across the terminals of said motor-generator only when said motor-generator is operating as a motor.

12. A meter rate compensator as set forth in claim 8 wherein the wall of said casing at the end at which said housing is supported is constructed of aluminum, and the coupling means between said motor-generator and said meter rotor comprises a pair of disk magnets axially aligned on opposite sides of said aluminum wall, one of said magnets being fixed to the shaft of said motor-generator and the other being fixed to said meter rotor.

References Cited
UNITED STATES PATENTS

| | | | |
|---|---|---|---|
| 1,700,692 | 1/1929 | Townsend | 73—261 |
| 1,837,333 | 12/1931 | Owens | 73—261 |
| 2,042,725 | 6/1936 | Montelius | 73—261 |

JAMES J. GILL, *Acting Primary Examiner.*

E. D. GILHOOLY, *Assistant Examiner.*

UNITED STATES PATENT OFFICE
CERTIFICATE OF CORRECTION

Patent No. 3,342,071            September 19, 1967

Douglas C. Meyers

It is hereby certified that error appears in the above numbered patent requiring correction and that the said Letters Patent should read as corrected below.

Column 8, line 10, for "motor" read -- meter --.

Signed and sealed this 1st day of October 1968.

(SEAL)
Attest:

Edward M. Fletcher, Jr.            EDWARD J. BRENNER
Attesting Officer            Commissioner of Patents